March 6, 1956  O. C. HELD ET AL  2,737,303
CABLE REEL TIERING TRUCK

Filed Jan. 9, 1953  5 Sheets-Sheet 1

INVENTORS
O. C. HELD
H. S. PIKE
R. R. TEICHNER
BY *W. C. Parnell*
ATTORNEY

March 6, 1956     O. C. HELD ET AL     2,737,303
CABLE REEL TIERING TRUCK

Filed Jan. 9, 1953     5 Sheets-Sheet 2

INVENTORS
O. C. HELD
H. S. PIKE
R. R. TEICHNER
BY
W.C. Parnell
ATTORNEY

March 6, 1956　　　O. C. HELD ET AL　　　2,737,303
CABLE REEL TIERING TRUCK
Filed Jan. 9, 1953　　　　　　　　　　　5 Sheets-Sheet 3

INVENTORS
O C HELD
H S PIKE
R R TEICHNER

BY

ATTORNEY

March 6, 1956     O. C. HELD ET AL     2,737,303
CABLE REEL TIERING TRUCK
Filed Jan. 9, 1953     5 Sheets-Sheet 4
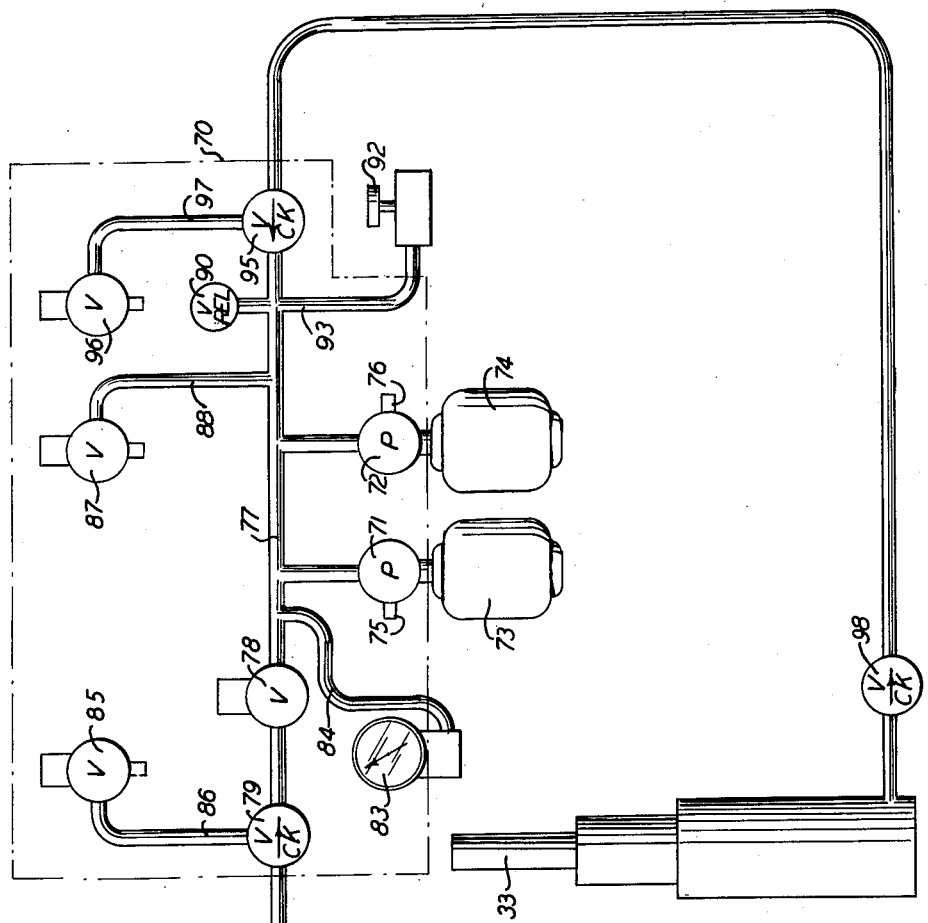
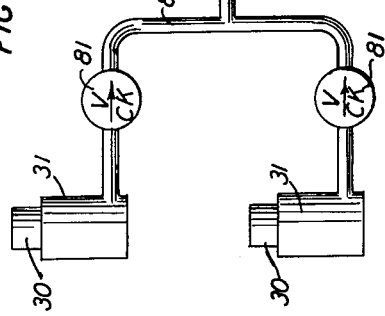
FIG 6
INVENTORS
O. C. HELD
H. S. PIKE
R. R. TEICHNER
BY *W. C. Parnell*
ATTORNEY

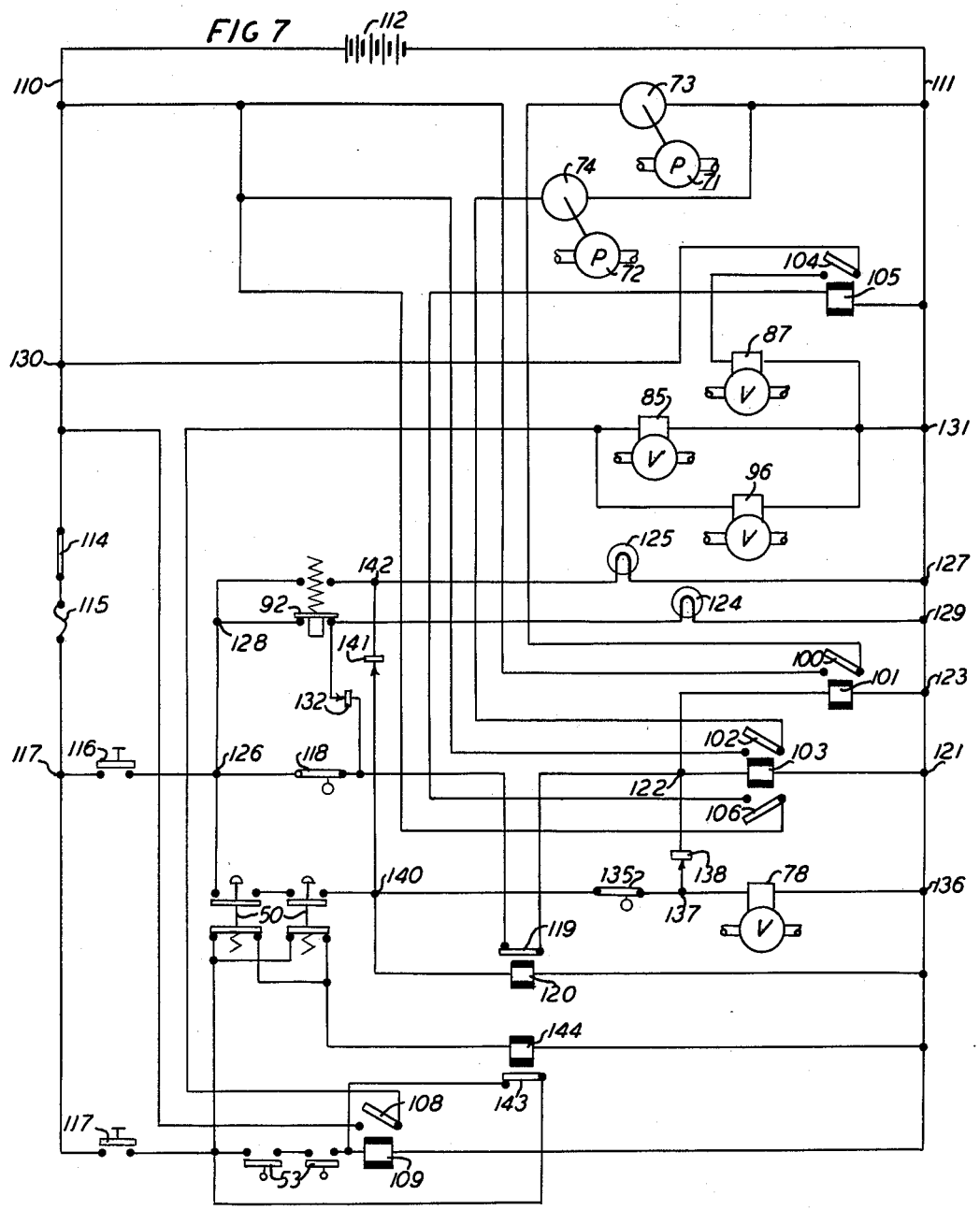

United States Patent Office 2,737,303
Patented Mar. 6, 1956

2,737,303

CABLE REEL TIERING TRUCK

Otto C. Held, Maspeth, N. Y., Harold S. Pike, Fanwood, N. J., and Rudolph R. Teichner, Roslyn Estates, N. Y., assignors to Western Electric Company, Incorporated, New York, N. Y., a corporation of New York Application January 9, 1953, Serial No. 330,556

11 Claims. (Cl. 214—16.4)

This invention relates to reel trucks and more particularly to reel trucks capable of placing reels on and removing them from supporting racks.

In the telephone industry there are repeated demands for cables of various sizes and for this reason supplies for the various sizes of cables must be available at prominent points throughout the nation. Due to these demands, numerous reels of cable must be kept at each location and when all the reels are placed on the same level a large area is required to accommodate them. Racks are therefore provided to support the smaller reels at elevated positions leaving the lower spaces for the larger reels. When mounting these heavy reels in such racks or removing them therefrom, the elevating mechanism used should be capable of being accurately positioned and closely controlled to handle a selected reel safely without disturbing or damaging others.

The object of the present invention is a reel truck capable of this performance and embodying controls which will assure accuracy and safety during depositing of reels on and removing reels form a rack.

With this and other objects in view, the invention comprises a reel truck for use in combination with a reel supporting rack having channeled vertical members and laterally extending notched members mounted at spaced positions to receive and support reel supporting rods, the reel truck comprising a wheel supported base with a vertical frame mounted thereon and a carriage movably supported by the frame with spaced arms having aligned notches therein to receive a supporting rod of a reel. There are means carried by the frame to move the carriage vertically relative to the rack and other means carried by the base for interengagement with the vertical channel members to position the carriage centrally between the notched members.

Cooperating with the positioning means of the base are micro-switches actuated by the notched members of the rack only when the carriage is contrally positioned therebetween to assure alignment of the notches of the members and the arms of the carriage while depositing a reel on the rack. Safety stops are also carried by the arms of the carriage to engage the notched members to limit upward movement during removal of a reel from the rack to guard against accidental disturbance of other reels. Furthermore, the carriage is provided with auxiliary arms for larger reels and for controlling the elevating means for the carriage depending on their positions.

Other objects and advantages will be apparent from the following detailed description when considered in conjunction with the accompanying drawings wherein:

Fig. 6 is a schematic illustration of the hydraulic system of the trucks; and

Fig. 7 is a wiring diagram of the control means for the truck.

Figure 1:
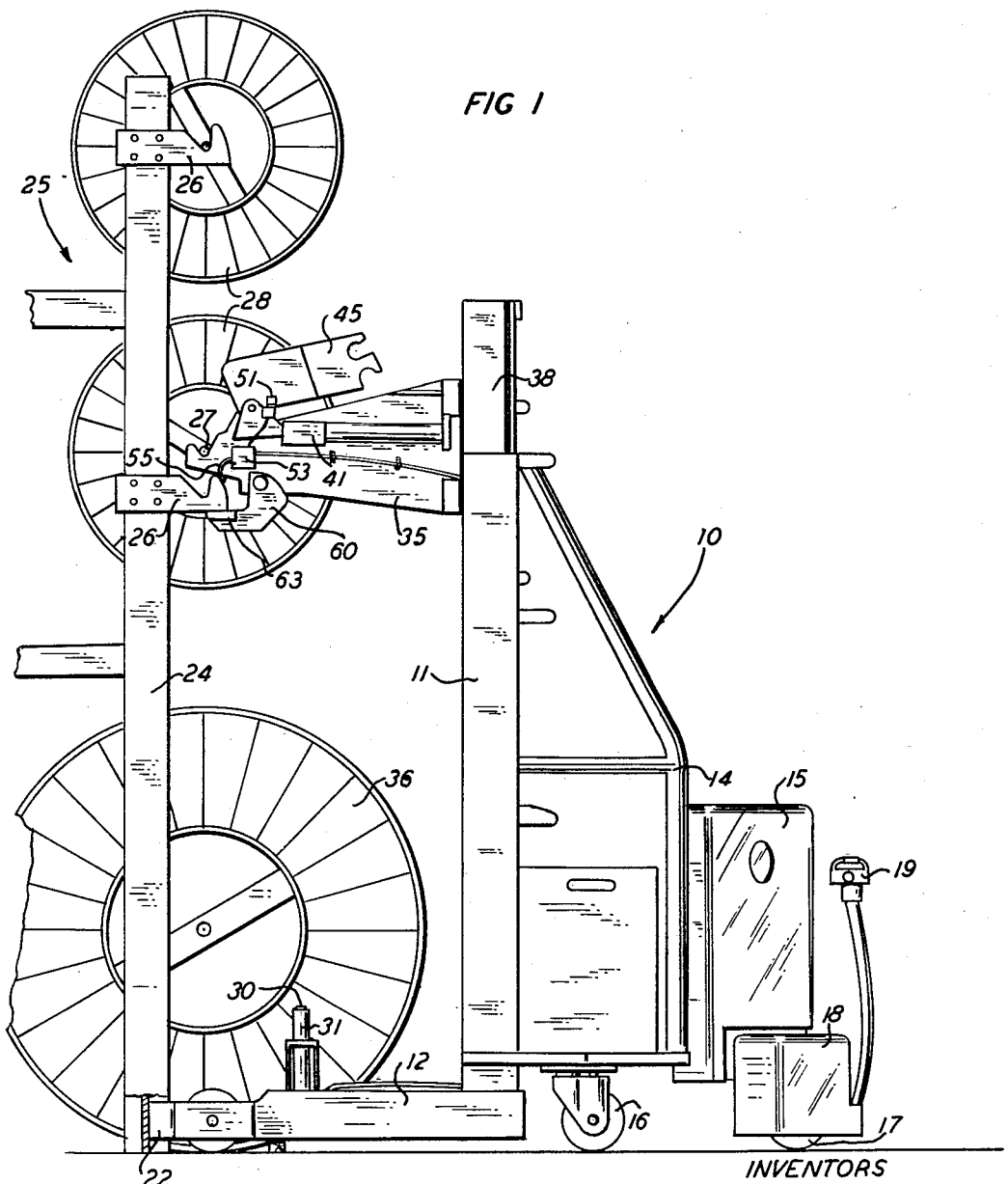
Fig. 1 is a side elevational view of the reel truck in combination with a reel supporting rack illustrating the mounting of a reel on the rack.

Referring now to the drawings, attention is directed first to Figs. 1 to 5 inclusive, which illustrate a truck 10 including a vertical frame 11 mounted on a wheel supported base 12. An auxiliary frame 14 and housing 15 for the various equipment and mechanism are supported respectively by wheels 16 and 17. The wheel 17 is a part of a pivotal unit 18 which may be controlled by the conventional type of handle 19.

The base 12 is U-shaped in general contour providing a central portion for supporting the frame 11 and leg portions 20 disposed at spaced parallel positions and supported at their outer ends by wheels 21. Locating members 22 are rigidly mounted on the outer ends of the leg portions 20 of the base for interengagement with spaced vertically extending channel or H-shaped members 24 of a reel support rack 25. The truck is designed for particular cooperation with the reel supporting rack 25 which includes sets of notched members 26 to receive the supporting rods 27 of what might be defined as the smaller or lighter reels 28.

Returning now to the reel truck and particularly the base 12 thereof, attention is directed to auxiliary rams 30, the housings 31 of which are firmly mounted on their respective legs 20. The auxiliary rams 30 are employed in cooperation with a main ram 33 for moving a carriage 35 when the truck is in position to handle larger reels 36.

Figure 2:
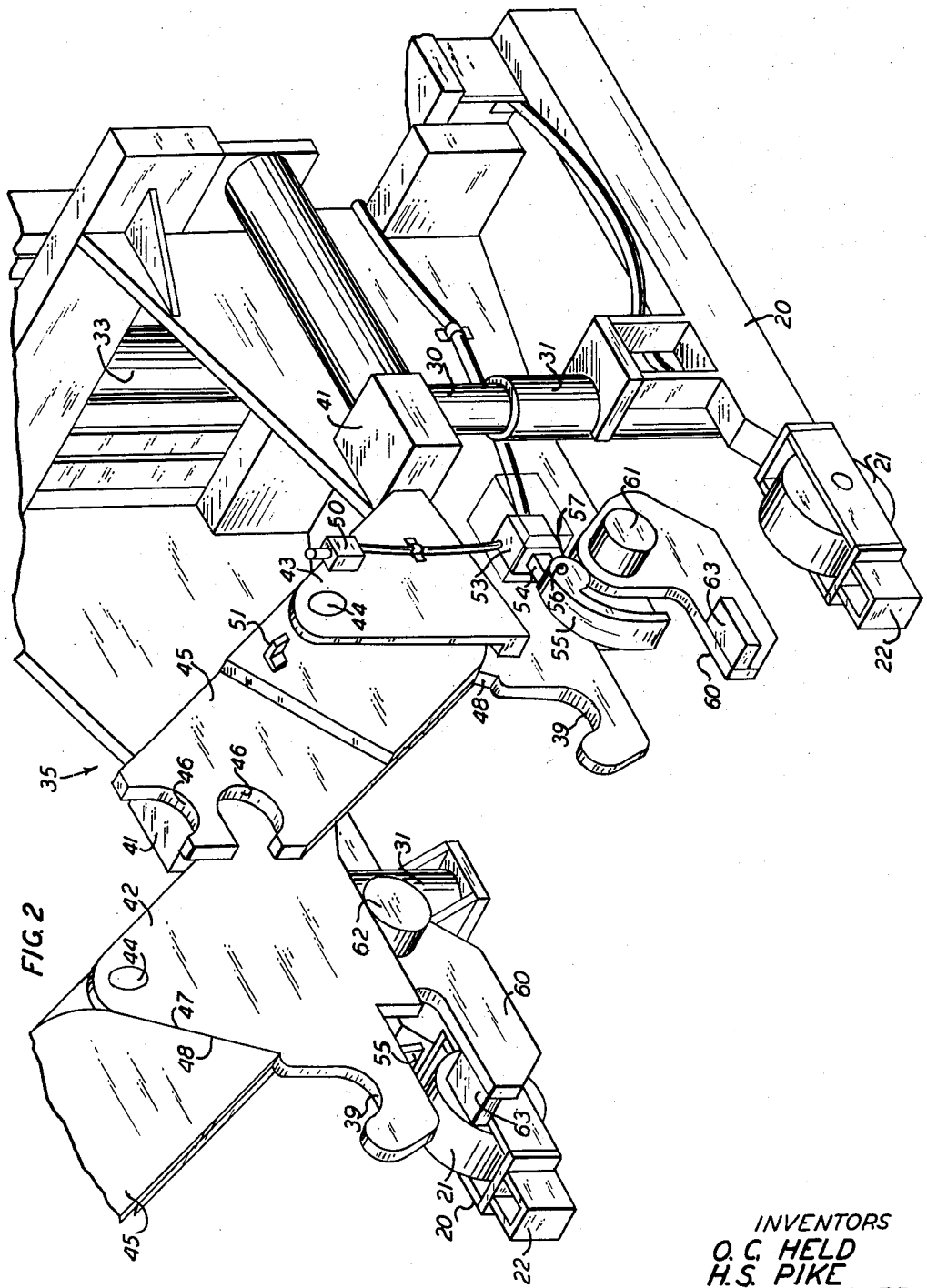
Fig. 2 is an enlarged fragmentary isometric view of a portion of the reel truck.
Figure 5:
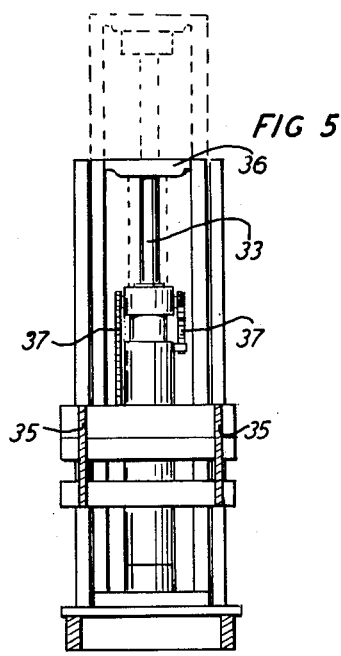
Fig. 5 is a vertical sectional view taken along the line 5—5 of Fig. 3.

The carriage 35 is U-shaped in general contour as illustrated more clearly in Fig. 2. The central portion of the carriage is connected in the conventional manner to the ram 33 as at 36 (Fig. 5). The frame 11 is similar in general contour to the frames of standard tiering trucks including the fixed outer part and the vertically movable telescoping inner part 38 which supports the carriage 35 for vertical movement therein relative to the base 12.

The arms of the carriage have aligned notches 39 in their forward ends to receive the supporting rods 27 of reels 28 singly. Supporting blocks 41 are mounted on the outer surfaces of the legs of the carriage 35 for engagement with the auxiliary rams 30 when the carriage is in position to receive and transport the larger cables 36. Projections 42 of the arms of the carriage 35, assisted by brackets 43, support pivots 44 for auxiliary arms 45 which are used only for the larger reels 36. The auxiliary arms 45 have notches 46 in their outer ends to receive the supporting rods 27 of the larger reels 36, when in the active positions shown in Figs. 2 and 3. When in this position, surfaces 47 of the auxiliary arms 45 engage surfaces 48 of their respective projections 42 of the arms of the carriage 35 to cooperate with their respective pivots 44 in supporting the larger reels. When the carriage is to support the smaller and/or lighter reels the auxiliary arms 45 are moved about their pivots into the inactive positions shown in Fig. 1, where micro-switches 50, supported by the brackets 43, will be actuated by lugs 51 mounted on their respective auxiliary arms 45.

Figure 3:
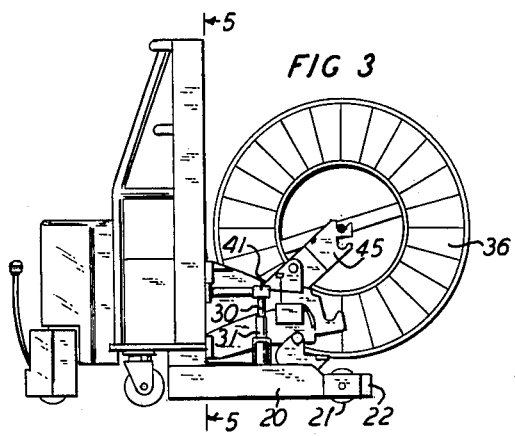
Fig. 3 is a side elevational view of the reel truck transporting a larger reel.
Figure 4:
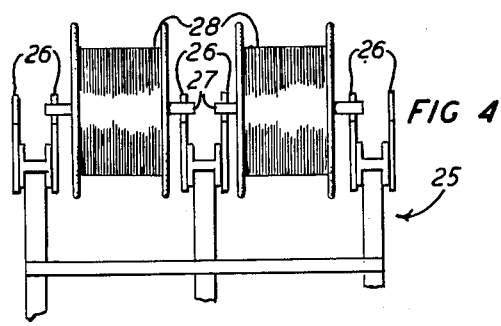
Fig. 4 is a fragmentary top plan view of the reel supporting rack shown in Fig. 1.

The micro-switches 50 are included in the control circuits hereinafter described together with micro-switches 53, the plungers 54 which are supported by the outer surfaces of the legs of the carriage and urged into engagement with controlling cams 55. The controlling cams 55 are mounted eccentrically on pivots 56 carried by the legs of the carriage 35 with portions 57 adapted to actuate the plungers of the micro-switches into closed positions when moved counterclockwise, viewing Figs. 1 and 2. The controlling cams 55 are normally urged clockwise into the positions shown where they may engage the notched members 26 of the rack 25, as illustrated in Fig. 1. Furthermore, safety members 60 of the contours shown in Figs. 1, 2 and 3, are pivotally supported at 61 by the arms of the carriage 34 and are counterbalanced to normally assume the positions shown where projections 62 on their inner surfaces will engage the surfaces of their respective carriage arms to limit movement in one direction. Projections 63 are mounted on the outer sides of the leading portions of the members 60 to assure engagement with the undersurfaces of their respective notched members 26 of the rack during removal of a reel therefrom to prevent unnecessary elevation of the carriage which might interfere with other reels on the rack.

Attention is now directed to the hydraulic features illustrated in Fig. 6. In the present embodiment of the invention, the hydraulic system includes a supply tank 70 for the fluid for use in the hydraulic system. Pumps 71 and 72, driven by motors 73 and 74 respectively, receive the fluid from the tank 70 through inlets 75 and 76 and force the fluid into a main line 77 which extends to the left through a solenoid valve 78 and a check valve 79 to a point 80 where it divides and extends through check valves 81 to the cylinders of the rams 30. In this portion of the main line, a pressure gage 83 is connected at 84 while a solenoid valve 85, connected through line 86 to the check valve 79, is normally closed as an exhaust to the tank 70.

In following the main line 77 in the opposite direction, there will be found a normally open solenoid valve 87 providing communication between the main line and the tank through an auxiliary line 88. A relief valve 80 is connected to the main line 77 and in the present instance it is set so that a maximum load of 5300 pounds may be elevated by the main ram alone and a maximum load of 8000 pounds may be elevated by all the rams. A pressure switch 92 is set to be moved from its bottom contacts to its top contacts when the load exceeds 3000, the pressure switch being connected to the main line 77 by auxiliary line 93. Continuing to the right along the main line 77 from the pumps there is a check valve 95 to which a normally closed solenoid valve 96 is connected to the line 97 to open communication between the check valve 95 and the tank 70. From the check valve 95 the main line extends through a check valve 98 to the cylinder of the main ram 33.

Attention is now directed to the wiring diagram shown in Fig. 7 which illustrates the motor 73 for driving the pump 71 under the control of make contact 100 of relay 101 while the motor 74 for pump 72 is under the control of top make contact 102 of relay 103. Furthermore, the solenoid valve 87 is under the control of make contact 104 or relay 105, this relay being under the control of bottom make contact 106 of relay 103. The solenoid valves 85 and 96 are connected in parallel in the same circuit under the control of make contact 108 or relay 109.

In the schematic illustration of the electrical control for the reel truck, main circuit lines 110 and 111 from a source of electrical energy such as a battery 112 may include, for example, in line 110 a suitable main switch 114 and fuse 115. The switch 114 is normally closed when the truck is to be used. In addition to the main switch 114 and the pressure switch 92, there are manually actuable switches 116 and 117. The switch 116 is actuated when it is desirable to elevate the carriage 35 with reels, singly, of various sizes and weights. The rack 25 was designed with consideration for the safety factors surrounding the reel truck and the weights of the reels to be stored. It was determined that reels weighing up to 3000 pounds could be elevated to and placed on the uppermost notched members 26, while heavier reels weighing up to 5300 pounds could be elevated to and placed on the lower notched members 26. The rack is formed to receive the larger and still heavier reels between the vertical members 24. These three groups of reels are, therefore, identified as light, intermediate and heavy reels. Switch 116 is disposed in a circuit extending from line 110 at connection 117 through an upper limit switch 118, break contact 119 of relay 120 and through relay 103 to line 111 at connection 121. Connected in parallel with relay 103 is relay 101 from connection 122 to line 111 at connection 123. When the switch 116 is closed, relay 103 is energized, making its contacts 102 and 106 to complete circuits respectively through the motor 74 for the pump 72 and through relay 105. At the same time, relay 101 is energized, making its contact 100 to complete a circuit through the motor 73 for the pump 71. Furthermore, circuits for indicating lamps 124 and 125 may be completed by the pressure switch 92. The circuit for the lamp 125 extends from connection 126, through the top contacts of pressure switch 92, when closed, to line 111 at connection 127, while the circuit for the lamp 124 extends from connection 128, through the bottom contacts of pressure switch 92, when closed, to line 111 at connection 129. Relay 105, when energized, will make its contact 104 completing a circuit from line 110 at connection 130, through contact 104, solenoid valve 87 to line 111 at connection 131.

If one of the light reels is being elevated, the solenoid valve 78 remains closed, cutting off the flow of liquid to the auxiliary rams 30. Closing of the normally open valve 87 will cause the fluid forced by the pumps 71 and 72 into the main line 77 to travel through the check valve 98 to the cylinder of the main ram 33. This operation of the main ram will move the carriage 35 upwardly. In this instance, the top limit switch 118 is actuated into open position but with the pressure switch 92 closing its bottom contacts, circuits through the relays 101 and 103 remain closed through a rectifier 132 in a branch of the circuit. During handling of the light reels for either mounting on or removing from the rack, the green light will be lit, due to the pressure switch 92, in this instance being set to move from its bottom contacts to its top contacts only after the load exceeds 3000 pounds.

If an intermediate reel should be mounted in the carriage and the switch 116 closed, the same circuits will be closed initially with the exception of those affected by the pressure switch 92, which at this time will be moved away from its bottom contacts and into engagement with its top contacts. Although the gage 83 will indicate to the operator the weight of the reel being elevated, the green light alone will indicate a light reel, the red light alone, will indicate an intermediate reel and both lights, when lit, will indicate a heavy reel.

At present let it be assumed than an intermediate reel has been elevated and that the top limit switch 118 has been opened. When this takes place, the circuits to the relays 101 and 103 open, de-energizing these relays together with relay 105 and, at the same time, effecting de-energization of the motors 73 and 74 for the pumps 71 and 72 and de-energization of the solenoid valve 87, permitting it to assume its normally open position, opening the main line 77 between the valves 78 and 95 to the tank 70. The check valve 95 will, in this instance, hold the liquid pressure in the line to the main ram 33 thus holding the carriage at the stopped position with the supporting rod for the intermediate reel a given distance above the plane of the lower notched members, until it is desirable to lower the carriage to deposit the ends of the supporting rods in the notches of their members.

To lower an elevated light or intermediate reel on the notched members of the rack, the truck must be moved laterally to position it as shown in Fig. 1 with the bumpers or locating members 22 disposed in their respective channels of the vertical members 24 of the rack so that one of the notched members on each vertical member will be positioned to be engaged by the controlling cams 55 to close the micro-switches 53. When this has been accomplished, that is when the carriage 35 with the reel has been disposed in a position such as that illustrated in Fig. 1 with the supporting rod 27 for the reel 28 in alignment with the notches of the members 26, the lowering means is conditioned for operation. The operator may then close the switch 117 to complete a circuit through switches 53 and relay 109 causing energization of the relay to make its contact 108, completing circuits through the normally closed solenoid operative valves 85 and 96. Energization of the solenoid valves 85 and 96 will open these valves permitting the fluid to drain back into the tank. Prior to this time, of course, the motors 73 and 74 for the pumps 71 and 72 have been de-energized either by opening of the top limit switch 118, should an intermediate reel be mounted in the carriage, or by releasing the switch 116 by the operator, should a light reel be mounted in the carriage, to open the circuits to the relays 101 and 103 including also the circuit to the relay 105.

In handling the heavy reels, the auxiliary arms 45 are swung into their outer positions as shown in Figs. 2 and 3, thus releasing the micro-switches 50 permitting them to close their top contacts, shown in Fig. 7, and open their bottom contacts. This action will render the top limit switch 118 ineffective and the bottom limit switch 135 effective, the bottom limit switch being disposed at a position to allow elevation of the heavy reels approximately eleven inches which is short of the maximum possible movement of the auxiliary rams 30. If the truck should be moved into position to receive the supporting rod 27 of a heavy reel, the operator may close the lift switch 116 which will complete a circuit from line 110 at connection 117, through switch 116, connection 126, the top contacts of switches 50, limit switch 135, solenoid valve 78 to line 111 and connection 136. At the same time, circuits will be completed from connection 137, through a rectifier 138, connection 122, through relay 103 to line 111 at connection 121. A circuit will be completed also from connection 122 through relay 101 to line 111 at connection 123. In this manner, the motors 73 and 74 for the pumps 71 and 72 will be energized to start the flow of fluid in the main line 77. The solenoid valve 87 is closed and the solenoid valve 78 is opened permitting the fluid under pressure to be directed to the auxliary rams 30 as well as the main ram 33. During the elevation of the heavy reel, the pressure in the line will not be sufficient to actuate the pressure switch 92 away from its bottom contacts due to the fact that the load is divided between three rams. The pressure switch 92 remaining in engagement with its bottom contacts completes a circuit through a green light 124, while a circuit is completed through the red light from line 110 at connection 117, through closed switch 116, connection 126, the top contacts of switches 50, connection 140, rectifier 141, connection 142 through the lamp 125 to line 111 at connection 127. Therefore, during the elevation of a heavy reel, and as long as the reel remains elevated during transporting of the reel from one position to another, both of the red and green lights remain lit. While the heavy reel is being elevated through the operation of the main and auxiliary rams, the power means including the pumps and the associated valves are under the control of the limit switch 135 which will be actuated into open position when the heavy reel has been raised the pre-determined distance, where the carriage will remain at this position until it is desirable to lower the carriage to deposit the heavy reel. To lower the carriage with the heavy reel, the switch 117 is moved into closed position completing the circuit through the break contact 143 of relay 144, through relay 109 to line 111, making contact 108 to energize the normally closed solenoid valves 85 and 96, allowing the fluid to drain back into the tank. At each instance during the lowering of the carriage, the main ram 33 is governed by the flow controlled valve 98 while the auxiliary rams 30, when in use, are governed by the load control valves 81. The relay 144 is energized to break contact 143 when switch 117 is closed during handling of light and intermediate reels as at that time the bottom contacts of switches are closed, placing the lowering circuit under the control of the switches 53. However, the switches 53 are not used in handling heavy reels and with the circuit through the relay 144 open by the switches 50, the entire control for lowering heavy reels lies in the switch 117.

During operation of the reel truck in conjunction with the reel supporting rack, it will be apparent that by the aid of the electro-hydraulic control means, the light reels may be elevated the full distance of movement of the carriage enabling the operator free action in placing the light reels on the uppermost notched members or removing the light reels therefrom. However, the control means is so arranged that the intermediate reels are limited in their upward movement whereby they may be readily placed on, or removed from the lower notched members 26 of a rack. This control of the limited movement prevents reels mounted in the upper members 26 from being disturbed during mounting of reels on the lower notched members. Additional safety features include the safety members 60 which are utilized during the removal of intermediate reels from their supporting or notched members 26, positioned to engage the notched members to act as stops for vertical movement of the carriage and to signify to the operator that the ends of the supporting rods 27 for the reel have been removed from the notches of the members 26 and may be moved, at this time, laterally away from the rack. Furthermore, auxiliary arms of the carriage, essential in handling the heavy reels condition the control means through the switches 50 to render the lower limit switch 135 ineffective during handling of light and intermediate reels but to render the lower limit switch effective when the auxiliary arms are moved outwardly into supporting positions. When the auxiliary arms are in the outer positions they render the auxiliary rams effective through the energization of the normally closed switch solenoid valve 78 which is de-energized by the opening of the lower limit switch 135 when the carriage with the heavy reel reaches the pre-determined limit which is sufficient to elevate the heavy reel for transportation.

Although the pressure gage indicates to the operator the pressure in the line whereby he may determine the particular type of reel mounted in the carriage and where it should be placed on the rack, the indicating lamps 24 and 25 serve as positive means in directing the operator where to position the reels on the rack.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A truck for transporting reels of various weight groups from the lightest to the heaviest reels and elevating them to various heights with the lightest uppermost and the heaviest lowermost, the truck comprising a carriage adapted to support reels of various weights singly, means to move the carriage vertically, and units affected by the weights of the reels to automatically stop said moving means to stop movement of the carriage at a height comparable to the weight of the reel supported thereby.

2. A truck for transporting reels of various weight groups from the lightest to the heaviest reels and elevating them to various heights with the lightest uppermost and the heaviest lowermost, the truck comprising a carriage adapted to support reels of various weights singly, means to move the carriage vertically, units affected by the weights of the reels to automatically stop said moving means to stop movement of the carriage at a height comparable to the weight of the reel supported thereby, and means responsive to the weight of each reel to indicate the limited height of movement of the carriage therefore.

3. A truck for transporting reels of various weight and elevating them to various heights depending on their weight, the truck comprising a carriage having main arms adapted to support reels up to a given weight, auxiliary arms supported on their respective main arms and movable from active positions, wherein they will be adapted to support heavier reels, to inactive positions wherein they will render the main arms effective to support reels, main elevating means for the carriage, auxiliary elevating means for the carriage, and means actuated by one of the auxiliary arms when in its inactive position to render the auxiliary elevating means ineffective.

4. A truck for transporting reels of various weight and elevating them to various heights depending on their weight, the truck comprising a carriage having main arms adapted to support reels up to a given weight, auxiliary arms supported on their respective main arms and movable from active positions, wherein they will be adapted to support heavier reels, to inactive positions wherein they will render the main arms effective to support reels, main elevating means for the carriage, auxiliary elevating means for the carriage, and means rendered effective by movement of the auxiliary arms into their active positions to render the auxiliary elevating effective with the main elevating means to elevate the carriage.

5. A truck for transporting reels of various weight and elevating them to various heights depending on their weight, the truck comprising a carriage having main arms adapted to support reels up to a given weight, auxiliary arms supported on their respective main arms and movable from active positions, wherein they will be adapted to support heavier reels, to inactive positions wherein they will render the main arms effective to support reels, main elevating means for the carriage, auxiliary elevating means for the carriage, means actuated by one of the auxiliary arms when in its inactive position to render the auxiliary elevating means ineffective, and means responsive to the weight of the reel to control the extent of elevation of the reel.

6. A truck for transporting reels of various weight and elevating them to various heights depending on their weight, the truck comprising a carriage having main arms adapted to support reels up to a given weight, auxiliary arms supported on their respective main arms and movable from active positions, wherein they will be adapted to support heavier reels, to inactive positions wherein they will render the main arms effective to support reels, main elevating means for the carriage, auxiliary elevating means for the carriage, and means actuated by one of the auxiliary arms when in its inactive position to render the auxiliary elevating means ineffective, means responsive to the weight of the reel to control the extent of elevation of the reel and means affected by the weight of the reel to indicate the height of elevation the carriage may be moved therewith.

7. A truck for transporting reels of various weight and elevating them to various heights depending on their weight, the truck comprising a carriage having main arms adapted to support reels up to a given weight, auxiliary arms supported on their respective main arms and movable from active positions, wherein they will be adapted to support heavier reels, to inactive positions wherein they will render the main arms effective to support reels, main elevating means for the carriage, auxiliary elevating means for the carriage, means rendered effective by movement of the auxiliary arms into their active positions to render the auxiliary elevating effective with the main elevating means to elevate the carriage and means rendered effective by movement of the auxiliary arms into their active positions to limit the height of movement of the carriage and heavier reel by the main and auxiliary elevating means.

8. The combination with a reel supporting rack having channelled vertical members with laterally extending members mounted at spaced positions thereon adapted to support reel supporting rods, of a reel truck comprising a wheel supported forked base having a central portion, a vertical frame mounted on the central portion of the base, a forked carriage movably supported adjacent a central portion thereof by the frame parallel with the forked base and having spaced arms with aligned recesses adjacent the free ends thereof to receive supporting rods of reels singly, means carried by the frame to move the carriage vertically relative to the rack, projecting means carried by the base for movement into engagement with the vertical channel members to centrally position the arms of the forked carriage adjacent to the laterally extending members of the rack, to align the reel supporting rod disposed in the recesses of the arms of the carriage with the members when positioned thereabove, and means operable only when the carriage is so positioned to lower the carriage to place the ends of the supporting rod on the laterally extending members.

9. The combination with a reel supporting rack having channelled vertical members with laterally extending members mounted at spaced positions thereon, adapted to support reel supporting rods, of a reel truck comprising a wheel supported forked base having a central portion, a vertical frame mounted on the central portion of the base, a forked carriage movably supported adjacent a central portion thereof by the frame parallel with the forked base and having spaced arms with aligned recesses adjacent the free ends thereof to receive supporting rods of reels singly, means carried by the frame to move the carriage vertically relative to the rack, projecting means carried by the base for movement into engagement with the vertical channel members to centrally position the arms of the forked carriage adjacent to the laterally extending members of the rack, means operable to lower the carriage with the reel and supporting rod to deposit the ends of the supporting rod on the members, and a unit supported by one of the arms of the carriage positioned to be actuated by one of the laterally extending members only when the carriage is centrally positioned between said members to cause operation of the lowering means.

10. The combination with a reel supporting rack having channelled vertical members with laterally extending members mounted at spaced positions thereon adapted to support reel supporting rods, of a reel truck comprising a wheel supported forked base having a central portion, a vertical frame mounted on the central portion of the base, a forked carriage movably supported adjacent a central portion thereof by the frame parallel with the forked base and having spaced arms with aligned recesses adjacent the free ends thereof to receive supporting rods of reels singly, means carried by the frame to move the carriage vertically relative to the rack, projecting means carried by the base for movement into engagement with the vertical channel members to centrally position the arms of the forked carriage adjacent to the laterally extending members of the rack, and means supported by the carriage to engage one of the laterally extending members to limit vertical movement of the carriage in removing a reel with its supporting rod from said members of the rack.

11. The combination with a reel supporting rack having channelled vertical members with laterally extending members disposed at different levels to respectively support reels of different weight groups with their supporting rods, of a reel truck comprising a wheel supported forked base having a central portion, a vertical frame mounted on the central portion of the base, a forked carriage movably supported adjacent a central portion thereof by the frame parallel with the forked base and having spaced arms with aligned recesses adjacent the free ends thereof to receive supporting rods of reels singly, means carried by the frame to move the carriage vertically relative to the rack, projecting means carried by the base for movement into engagement with the vertical channel members to centrally position the arms of the forked carriage adjacent to the laterally extending members of the rack, and control units for the carriage moving means responsive to the weight of each reel to automatically stop elevation of the carriage when each reel carried thereby is in general alignment with the lateral members for its weight group.

References Cited in the file of this patent

UNITED STATES PATENTS

| | | |
|---|---|---|
| 781,051 | Darrin | Jan. 31, 1905 |
| 1,768,360 | Jenney | June 24, 1920 |
| 2,309,730 | Hastings, Jr. | Feb. 2, 1943 |
| 2,357,783 | Snelling | Sept. 5, 1944 |
| 2,451,368 | White et al. | Oct. 12, 1948 |
| 2,536,068 | Lehmann | Jan. 2, 1951 |
| 2,578,006 | Green | Dec. 11, 1951 |
| 2,579,730 | Eurey | Dec. 25, 1951 |
| 2,598,413 | Morley | May 27, 1952 |
| 2,620,932 | Alpine | Dec. 9, 1952 |
| 2,643,781 | Wise | June 30, 1953 |
| 2,691,449 | Claybourn | Oct. 12, 1954 |

FOREIGN PATENTS

| | | |
|---|---|---|
| 320,467 | Germany | Apr. 22, 1920 |